May 21, 1968  H. C. MILLER  3,384,064
ADJUSTABLE SPACER AND STABILIZING MEANS FOR
THE SAW BLADES OF A GANG SAWMILL
Filed May 2, 1966  3 Sheets-Sheet 2
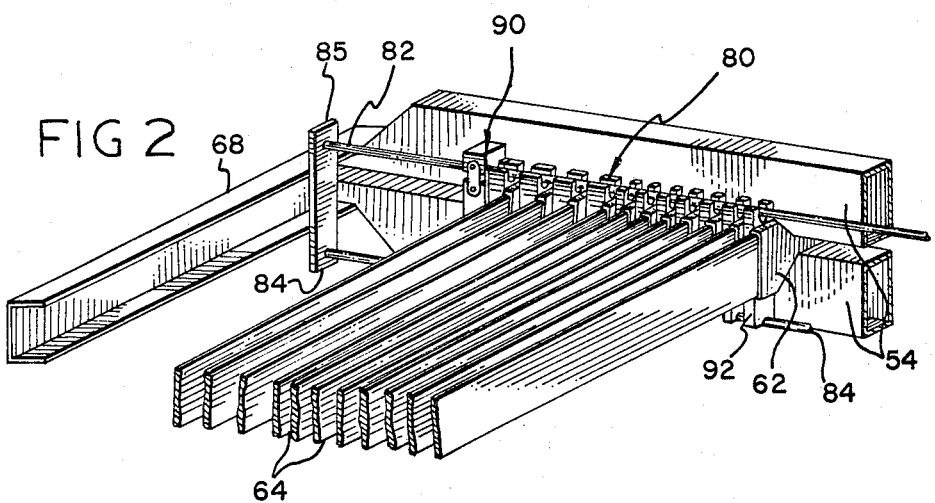
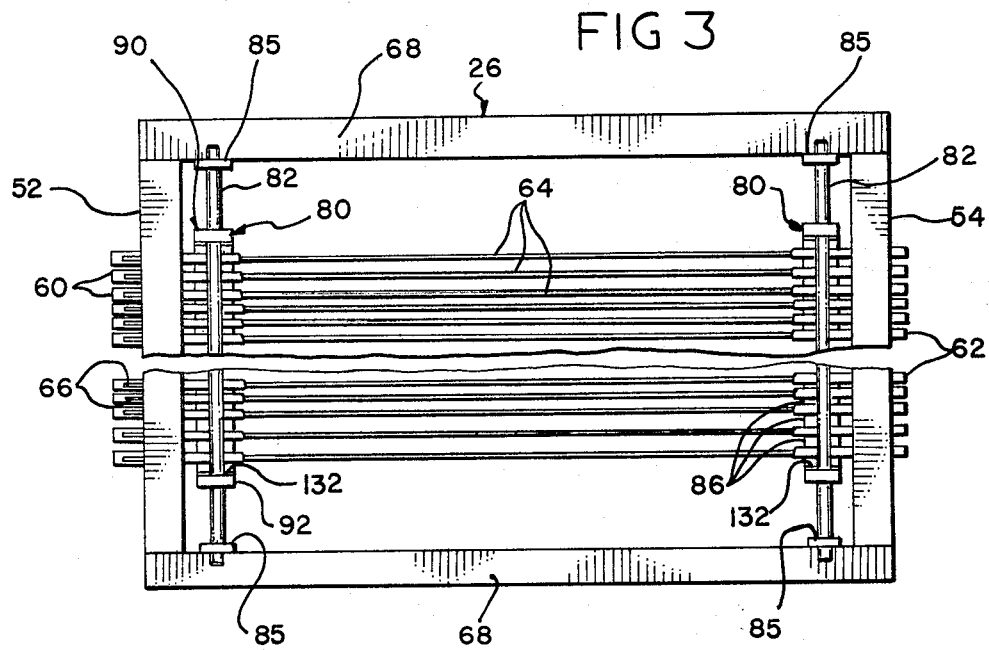
INVENTOR
HAROLD C. MILLER
BY
ATT'Y May 21, 1968

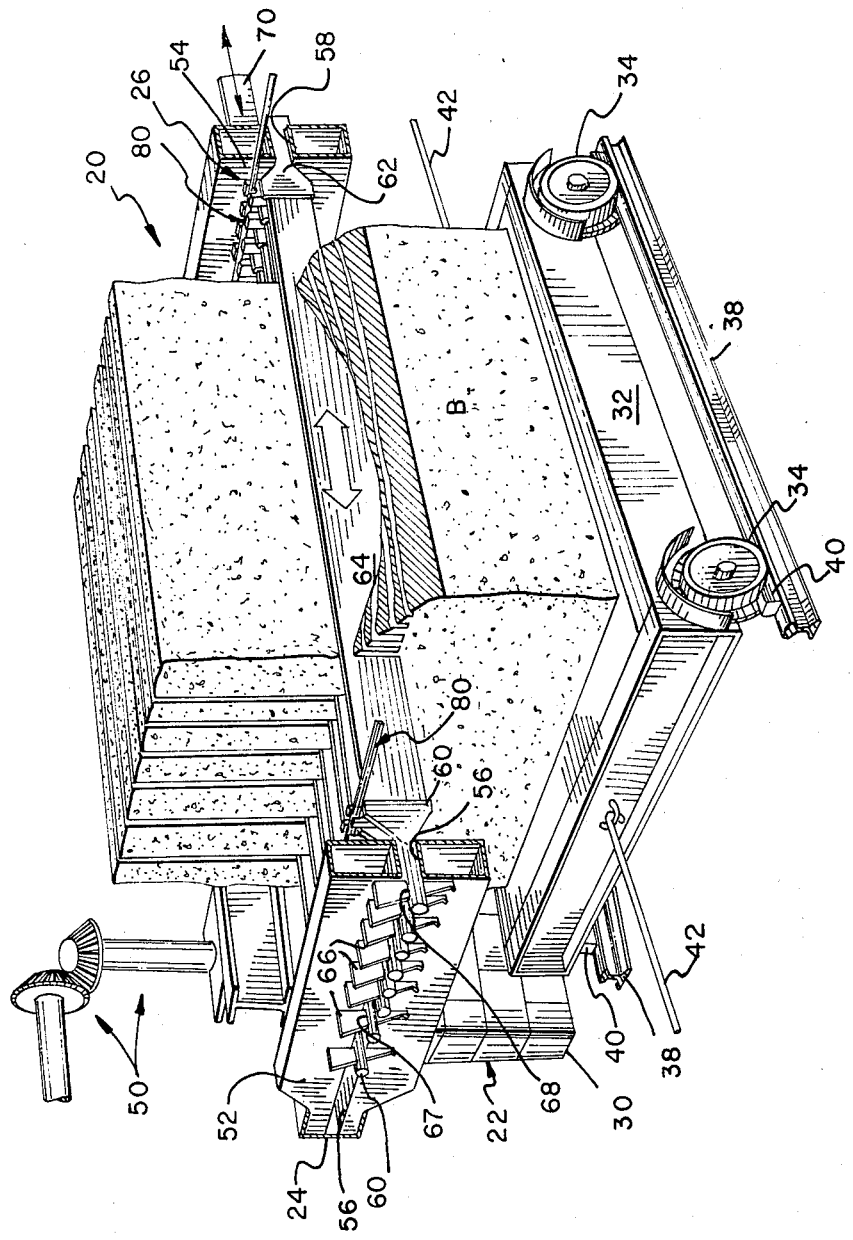

H. C. MILLER 3,384,064

ADJUSTABLE SPACER AND STABILIZING MEANS FOR
THE SAW BLADES OF A GANG SAWMILL

Filed May 2, 1966

INVENTOR
HAROLD C. MILLER
BY
ATT'Y

United States Patent Office 3,384,064
Patented May 21, 1968

1

3,384,064
ADJUSTABLE SPACER AND STABILIZING MEANS
FOR THE SAW BLADES OF A GANG SAWMILL
Harold C. Miller, Chicago, Ill., assignor to Super-Cut,
Inc., Chicago, Ill., a corporation of Illinois
Filed May 2, 1966, Ser. No. 546,669
7 Claims. (Cl. 125—17)

ABSTRACT OF THE DISCLOSURE

A spacer arrangement in the form of a series of spacer blocks and guide rods by means of which the various saw blade hangers of a gang sawmill may be maintained in selected spaced positions along the foot and header beams of the sawmill.

---

The present invention relates to a novel means for maintaining proper spacing between the adjacent but spaced apart tensioned saw blades of a reciprocable gang sawmill in order that all of the saw blades will function in exact parallelism and thus, in connection with use of the gang sawmill to cut a slab of stone or similar material, produce slab sections of uniform thickness throughout their entire face areas.

It is well known that in a gang sawmill, proper spacing between saw blades and the maintenance of the individual saw blades in a plumb or planar condition, i.e., with the general planes of the saw blade bodies extending vertically, is essential in order to obtain proper sawing operations. Heretofore, efforts to attain these two prerequisites have not been altogether satisfactory. Since misalignment of the saw blades of a gang sawmill is invariably a function of the positions of the blade hangers at the opposite ends of the reciprocable sawmill sash, alignment precautions must be taken at each end of the sash. One common procedure is to insert wooden spacer blocks in between adjacent blade hangers at each end of the sash, and when all of the blocks are in position, to compact the hangers and blades by driving a diagonal type wedge bar between each outermost hanger and the adjacent longitudinal sash member. This procedure is troublesome and costly. Suitable means for holding the wooden spaced blocks in position until compression is applied must be provided and slippage of one or more spacer blocks must be guarded against because such slippage causes misalignment of adjacent blade hangers. The blocks are susceptible to deformation under heavy compression and, in time, they shrink while the gang sawmill is in use, thus loosening the compacted mass of spacer blocks and hangers. Moreover, the wooden spacer blocks invariably are deformed so that they are incapable of being reused, a very short period of shelf life due to drying out of the wood also contributing to the necessity for discarding used blocks. Accurate sawing operations in manufacturing the wooden spacer blocks are infrequent and a given lot of blocks will be found to have wide tolerances of dimensions. The time consumed in preparing a set of blocks for each saw blade installation is inordinate since each block must be individually measured, cut, and then applied in the installation. Errors are cumulative as the installation progresses and frequently, to correct a minor error at one place, another error must be committed. Installation procedure is thus largely a matter of trial and error. Since it is impractical to catalogue the blocks according to dimensions, a completely new set of blocks is usually fashioned for each succeeding saw blade installation. Not only does spacer block installation present a problem, but block alignment is also quite difficult to attain. Spacer blocks have been known to fall out of a given installation during use of the associated gang sawmill, thus throwing the entire saw blade adjustment out of line.

The present invention is designed to overcome the above-noted limitations that are attendant upon the construction and use of conventional saw blade spacing and rigidifying means and, toward this end, the invention contemplates the provision of a spacer "kit" or assembly of parts which, when operatively installed in the reciprocable sash of a gang sawmill, will enable saw blade adjustments to be quickly and accurately made with a considerable saving in time and by measured standards thereby eliminating individual painstaking saw blade adjustments. The provision of such a spacer assembly constitutes the principal object of the invention.

Other objects and advantages of the invention, not at this time enumerated, will readily suggest themselves as the nature of the invention is better understood from a consideration of the following detailed description or specification.

In the accompanying three sheets of drawings forming a part of this specification, one illustrative embodiment of the invention is shown.

In these drawings:

FIG. 1 is a fragmentary perspective view of a gang sawmill showing the saw blade spacing means of the present invention operatively installed in the sash thereof;

FIG. 2 is an enlarged fragmentary perspective view of one corner region of the sash of the gang sawmill showing the saw blade spacer means in greater detail;

FIG. 3 is a plan view of the sawmill sash with the completely assembled spacer means operatively applied thereto;

Figure 4:
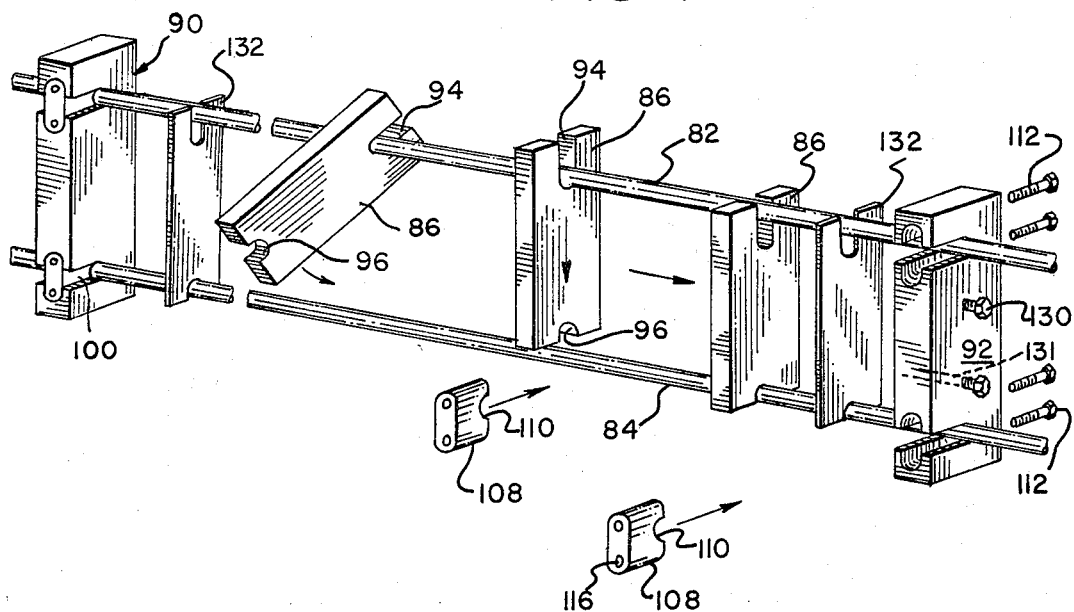
FIG. 4 is an enlarged fragmentary perspective view showing the principal components of the spacer assembly and illustrating the manner in which such components are installed in such assembly.

Referring now to the drawings in detail and in particular to FIG. 1, the adjustable spacer means or assembly of the present invention is illustrated as being operatively installed in a gang sawmill 20 of the type which is shown and described in my co-pending United States patent application Ser. No. 440,866, filed on Mar. 18, 1965 and entitled "Gang Sawmill With Particular Hydraulic Saw Blade Tensioning Means." The sawmill 20 is purely exemplary of a typical environment for the present saw blade spacer means or assembly and numerous other environments are susceptible to installation of the present spacer means therein, the only requisite being that such environment embodies a reciprocable saw blade supporting frame or such having parallel tensioned saw blades extending longitudinally thereacross.

For a full disclosure of the gang sawmill 20, reference may be had to the aforementioned patent application, however, for purposes of discussion herein in connection with the present invention, it is adequate that only a brief description leading to the operation of the sawmill be set forth. Accordingly, the sawmill 20 is shown as being in operation upon a relatively massive slab or block B of ceramic material, such, for example, as limestone. The gang sawmill 20 involves in its general organization a pair of horizontal side supports, only the left-hand support 22 being illustrated. It will be understood that a similar right-hand support is provided and it is spaced laterally from the left-hand support 22 and extends in parallelism therewith. The two side supports are capable of being raised and lowered bodily, and in connection with use of the gang sawmill to cut the block B into sections as they are fed slowly downwards. Each side support is built up from I-beams and other suitable structural members and includes a horizontal channel member 24 which opens inwardly of the sawmill and is for the purpose of slidably supporting therein the adjacent side part of a rectangular, horizontally disposed, bodily reciprocable sawmill sash 26. The side supports overlie respective masonry walls 30 which define between them the working area of the sawmill. A rectangular work-receiving carriage 32 having flanged wheels 34 at its corners is tractionally supported on rails 38, but during sawmill operation, it is maintained stationary by wheel chocks 40 and horizontal anchor struts 42, the latter constituting parts of the mechanism for propelling the carriage to or from the sawmill. A feed screw arrangement 50 is provided for raising and lowering the two side suppots and thus correspondingly raising or lowering the sash 26. Said sash 26 is in the form of a horizontally rectangular frame including a split header beam 52 and a similar split foot beam 54. These two split beams define narrow horizontal slots 56 and 58, respectively, the slot 56 receiving therein a series of forward blade hangers 60, and the slot 58 receiving therein a similar series of rear blade hangers 62. The hangers 60 and 62 are arranged in longitudinally aligned pairs, each pair serving to support therebetween one of a series of parallel but spaced apart saw blades 64. Vertical wedges 66 pass through vertical slots 67 in the forward blade hangers 60, and when thees wedges are driven to their home positions, the saw blades 64 are placed under tension. The header beam 52 and foot beam 54 are connected together in the sash 26 by longitudinal side members 68 (see FIG. 3). A connecting rod 70 is attached to the foot beam 54 and is adapted to be connected to a power-operated eccentric type driving mechanism (not shown) by means of which the sash 26 may be reciprocated bodily as a unit within the two guideways that are afforded by the channel members 24.

The arrangement of parts thus far described is purely conventional and a similar arrangement exists in connection with a wide variety of gang sawmills of different manufacture. No claim is made herein to any novelty that is associated with the gang sawmill 10, as such, the novelty of the present invention residing rather in the particular saw blade spacing and stablizing means which will now be described in detail and subsequently claimed.

As best seen in FIG. 1, the rectangular horizontally reciprocable sash 26 and, consequently, the saw blades 64 that are carried thereby have a longitudinal extent appreciably greater than the longitudinal extent of the slab B undergoing sawing by the gang sawmill 20 so that adequate room will be afforded at the ends of the slab for full amplitude reciprocation of the sash. In each of the spaces which exist between the ends of the slab and the two split beams 52 and 54, a saw blade spacer and stabilizing assembly embodying the principles of the present invention is operatively installed. These two assemblies are designated in their entireties by the reference numeral 80, and since they are substantially identical, a description of one of them will suffice for both.

Each assembly 80 comprises upper and lower spacer block guide rods 82 and 84 (see FIGS. 2 and 3) which are vertically spaced from each other and lie in a common vertical plane. These rods respectively assume elevations slightly above and below the level of the saw blades 14. They are supported at their ends in vertical parallel plates 85 which are welded or otherwise suitably secured to the longitudinal side members 68 of the sash 26. The guide rods 82 and 84 serve to support a horizontal series of generally rectangular vertically elongated spacer blocks 86 which correspond in number and widths to the number of spaces between adjacent saw blade hangers 62, and to the desired saw blade widths or spacings between the adjacent blades as determined by the spacings between the hangers 62. The spacer blocks 86 are preferably formed of a high density polyethylene copolymer and, therefore, they are extremely durable and hard and not subject to breakage or distortion under compressional forces. Additionally, they are resistant to fracture or cleavage when dropped or otherwise subjected to impact forces. The spacer blocks 86 are adjustable transversely of the sash 26 and along the rods 82 and 84 in a manner and for a purpose that will be made clear presently.

Each assembly 80 further comprises two steel reaction blocks in the form of an anchor block 90 at one side of the sash 26 and a compression block 92 at the other side of the sash. The various spacer blocks 86 are made in different widths to accommodate different desired spacings between adjacent saw blade hangers, and in the sash assembly there is an alternation between the spacer blocks and the saw blade hangers with the two steel reaction blocks being disposed at the opposite ends of the row or series of spacer blocks, the block 90 assimilating the compressional force that is exerted upon the series of sandwiched blocks and saw blade hangers by the compression block 92.

Except for differences in block widths, the various spacer blocks 86 are identical in construction and each is in the form of a flat plate-like member having a relatively deep notch 94 in its upper end and a relatively shallow notch 96 in its lower end. The difference in notch depths facilitates installation and removal of the spacer blocks onto and from the two vertically spaced horizontal guide rods 82 and 84, it being necessary for installation to telescope the notch 94 over the rod 82 and then swing the block so that the notch 96 registers vertically with the other rod 84, after which the block may be lowered into position on the rod 84 with the latter seating within the notch 96 as clearly shown in FIG. 4.

Figure 5:
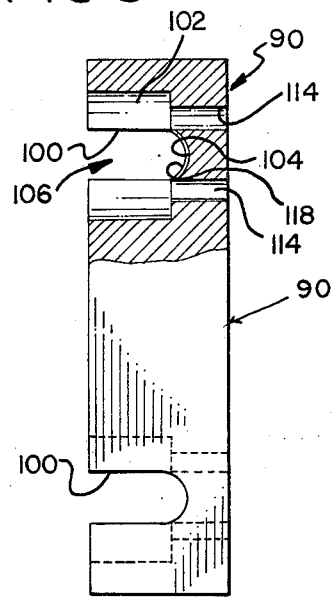
FIG. 5 is an enlarged side elevational view, partly in section, of one of the compression blocks which are employed in connection with and constitute parts of the present invention.
Figure 6:
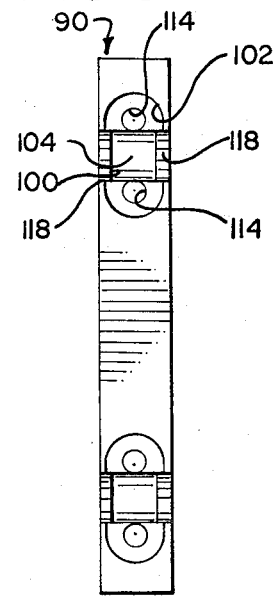
FIG. 6 is an edge view of the compression block of FIG. 5.
Figure 7:
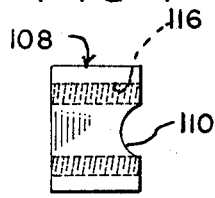
FIG. 7 is a side elevational view of one of a series of clamping plugs which are employed in connection with the invention.
Figure 8:
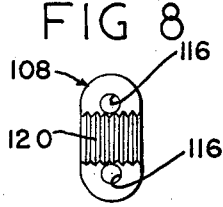
FIG. 8 is an end elevational view of the clamping plug of FIG. 7.

The anchor block 90 is vertically elongated. As shown in FIG. 5, it is of appreciable thickness and in the upper and lower regions thereof it is provided with laterally opening notches 100 of a width substantially equal to the diameter of the rods 82 and 84. The side walls of the notches 100 are provided with opposed semi-cylindrical recesses 102, and the bottom walls of the notches are provided with outwardly facing semi-cylindrical recesses 104. The notched and recessed arrangements just described provide, in effect, upper and lower elongated generally oval recesses 106 which are designed for respective reception therein of a pair of clamping plugs 108, the shape of the latter being conformable to the shape of said recesses 106. The clamping plugs 108 are provided at their inner ends with semi-cylindrical recesses 110 which oppose and are complemental to the recesses 104 in the bottom walls of the notches 100, said recesses 110 and 104 constituting, in effect, pairs of clamping jaws which straddle the rods 82 and 84 when the plugs are operatively installed in the recesses 106. Horizontal clamping screws 112 project through horizontal bores 114 in the anchor block 90 and are threadedly received in horizontal internally threaded bores 116 in the clamping plugs 108. It is to be noted at this point that the bottom walls of the notches 100 in the upper and lower regions of the anchor block 90 are provided with lateral or marginal friction ribs 118 of small width so that upon tightening of the clamping screws 112, these ribs will make firm frictional engagement with the rods 82 and 84. For the same reason, the recesses 110 in the plugs 108 are ribbed as indicated at 120 in FIG. 8.

The compression block 92 is substantially identical to the anchor block 90, it being notched, recessed and relieved in the same manner as the block 90. Therefore, in order to avoid needless repetition of description, identical reference numerals have been applied to the corresponding parts as between these two blocks. The compression block 92 differs from the anchor block 90 solely by the provision of a pair of spacer block and hanger clamping screws 130 which project through threaded bores 131 in the block 92 and the ends of which are designed for engagement with a relatively thin metallic bearing plate 132. The latter conforms in outline to the outlines of the spacer blocks 86 and is similarly applied to and removed from the two vertically spaced guide rods 82 and 84.

In effecting any given installation, after the saw blade assembly has been made and the sawmill is ready for operation, except for saw blade adjusting and tensioning operations, the saw blades are distributed along the split beams 52 and 54 of the sash 26 so that there will be room in between adjacent blades for facile spacer block installation. Thereafter, the steel anchor block 90 and the steel compression block 92 are installed upon the upper and lower guide rods 82 and 84 in the maner previously described and on opposite sides of the saw blade group. All of the saw blades and their hangers are loosely disposed in the sash for ease of shifting movement transversely of the sash. The proper or most judicious position of the extreme left hand saw blade is ascertained, the saw blade slid to such position, and thereafter, the anchor block 90 is slid to the right as viewed in FIG. 2 until it abuts against the adjacent side of the previously positioned hanger 62. The clamping plugs 108 are then inserted in the recesses 106 of the anchor block 90 and the clamping screws 112 are tightened in order securely to affix the anchor block to the guide rods 82 and 84.

Thereafter, one by one, the spacer blocks 86 are installed upon the guide rods 82 and 84 successively and extending from left to right until each pair of adjacent saw blades has interposed therebetween one of the spacer blocks. The thin steel bearing plate 132 is then installed on the guide rods 82 and 84 so as to oppose the extreme right hand saw blade hanger 62 and, finally, the compression block 92 is installed upon the two guide rods 82 and 84 at the right of the entire assembly of hangers and spacer blocks. Pressure is then applied in any suitable manner to the compression block tending to shift it inwards of the saw blade and hanger assembly, i.e., to the left as viewed in FIG. 2, thus forcing all of the hangers and intervening spacer blocks 86 into a compact mass and bringing all of the saw blades to their correct sawing positions. When a reasonably compact assembly has thus been effected, the clamping plugs 108 are installed in the recesses 106 of the compression block 92 and the clamping screws 112 tightened. Thereafter, the clamping screws 130 are tightened against the bearing plate 132 and, after the wedges 66 have been driven to their home positions to tension the saw blades, the saw blade is then ready for immediate operation. Since the spacer blocks 86 are manufactured on a precision basis and have accurately parallel side faces, all of the saw blade hangers 62 will be held in true vertical positions and the various saw blades will likewise be maintained vertical and with the predetermined spacings between adjacent blades being maintained throughout the operation of the sawmill.

The invention is not to be limited to the exact arrangement of parts shown in the accompanying drawings or described in this specification as various changes in the details of construction may be resorted to without departing from the spirit or scope of the invention. Therefore, only insofar as the invention is particularly pointed out in the accompanying claims is the same to be limited.

Having thus described the invention what I claim as new and desire to secure by Letters Patent is:

1. In a gang sawmill, the combination with a rectangular horizontally reciprocable saw blade sash including a header beam and a foot beam connected by side members and between which there extends a series of composite saw blade units which are capable of lateral sidewise adjustment along said beams transversely of the sash, together with tensioning means whereby such blade units may be drawn taut between the beams, of a combined spacer and stabilizing assembly for clamping said saw blade units in predeterminedly spaced positions with respect to one another and to the side members, said assembly comprising upper and lower parallel guide rods effectively secured at their ends to said side members and disposed above and below the level of the saw blade units respectively, a series of spacer blocks removably mounted on said guide rods for free sliding movement therealong transversely of the sash and adapted for individual insertion between adjacent saw blade units, a pair of reaction blocks likewise mounted on the guide rods for similar sliding movement thereon and adapted for positioning alongside the outermost saw blade units of the series and between said latter units and the adjacent side members, means for fixedly clamping each of said reaction blocks to said guide rods, and expansible means interposed between one of said reaction blocks and the adjacent saw blade unit and effective to compress said saw blade units and the interposed spacer blocks against the other reaction block in order thus to rigidify the assembly of saw blade units and spacer blocks.

2. In a gang sawmill, the combination set forth in claim 1 and wherein said expansible means comprises a clamping screw threaded in said one reaction block and having an end thereof effectively engageable with the adjacent saw blade unit.

3. In a gang sawmill, the combination set forth in claim 1 and wherein each spacer block is formed with oppositely facing notches in its upper and lower edges respectively, said guide rods being receivable in said notches, the distance between the bottoms of said notches being less than the distance between said guide rods whereby the spacer block may be installed upon the guide rod by successively causing said notches to straddle their respective guide rods.

4. In a gang sawmill, the combination set forth in claim 1 and wherein each spacer block is formed with oppositely facing upper and lower notches in its upper and lower edges respectively, the upper notch being of greater depth than the lower notch, the distance between the bottom of the upper notch and the lower edge of the block being less than the distance between said guide rods, and the distance between the bottom of the lower notch and the upper edge of the block being greater than the distance between said guide rods.

5. In a gang sawmill, the combination set forth in claim 1 and wherein each reaction block is formed with a pair of guide rod-receiving notches in one side edge of the block, a clamping plug for each notch receivable in such notch and engageable with the adjacent guide rod for drawing the bottom region of the notch into frictional engagement with the guide rod, and means for drawing the clamping plug into the notch.

6. In a gang sawmill, the combination set forth in claim 5 and including, additionally, a series of friction ribs on the bottom of each notch in the reaction block.

7. In a gang sawmill, the combination set forth in claim 5 and including, additionally, a series of cooperating friction ribs on the bottom of each notch and on the associated clamping plug and engageable with the associated guide rod for clamping the latter therebetween.

References Cited

UNITED STATES PATENTS

| | | | |
|---|---|---|---|
| 148,032 | 3/1874 | Butler | 143—156 |
| 507,357 | 10/1893 | Fossick | 125—17 |
| 510,962 | 12/1893 | Deuther | 143—156 |

FOREIGN PATENTS

| | | |
|---|---|---|
| 40,025 | 7/1887 | Germany. |
| 1,003,428 | 2/1957 | Germany. |

OTHER REFERENCES

German printed application No. 1,003,428, February 1957.

HAROLD D. WHITEHEAD, *Primary Examiner.*